3,089,898
PREPARATION OF METHYL ACRYLATE
James F. Vitcha, New Providence, and James P. Russell, Scotch Plains, N.J., assignors to Air Reduction Company, Incorporated, New York, N.Y., a corporation of New York
No Drawing. Filed June 29, 1961, Ser. No. 120,514
7 Claims. (Cl. 260—486)

This invention relates to the synthesis of methyl acrylate. More particularly, it relates to an improved catalytic vapor phase synthesis for producing methyl acrylate by condensing methyl acetate with formaldehyde.

Methyl acrylate is used extensively in the manufacture of synthetic resinous polymers and because of a steadily increasing demand for methyl acrylate, two recently patented processes are of particular interest, namely, Redmon U.S. Patent No. 2,734,074 and Etherington U.S. Patent No. 2,821,543.

The present invention constitutes an improvement over the prior art such as that represented by these two patents, and resides in the discovery of an improved process for obtaining methyl acrylate which comprises contacting vapor mixtures of methyl acetate and formaldehyde with aluminosilicate catalysts. The aluminosilicates suitable for this invention are complex synthetic alumino-silicates which are generally known as zeolites. Outstanding results are obtained with alkaline earth metal zeolite catalysts, and good results are also obtained with alkali metal zeolites and zeolites of certain heavy metals such as manganese, cobalt, zinc, cadmium, and lead. Other zeolites are also useful as catalysts in this invention, although results are generally not as good as with the zeolites previously mentioned. A suitable sodium aluminosilicate for the practice of this invention is a material sold commercially under the name "Decalso" by The Permutit Company, and presently used for water softening. The other aluminosilicates can be prepared from sodium aluminosilicate by conventional base exchange procedures.

The process by which methyl acrylate is formed according to the process of the present invention may be represented by the following overall reaction:

$$HCHO + CH_3COOCH_3 \rightarrow CH_2{:}CHCOOCH_3 + H_2O$$

which probably proceeds via the formation of an intermediate hydroxyester which then loses a molecule of water to yield the desired methyl acrylate.

Various commercial sources of formaldehyde such as aqueous, alcoholic, or other solutions can be used in the practice of this invention in place of the pure anhydrous materials preferred by the prior art patentees noted above.

The reaction takes place at temperatures in the range of about 325° C. to about 425° C. in the presence of suitable catalysts as indicated above. Best results are obtained at about 350° to 400° C. The reaction can be conducted at atmospheric pressure or at lower or higher pressures. The use of elevated pressures facilitates recovery of the product and makes it possible to use shorter contact times than those used at atmospehric pressure, and the use of pressures up to about 200 p.s.i.g. may be advantageous. The space velocity may vary over wide limits, from 200 liters/hour/liter of catalyst or lower to about 10,000 liters/hour/liter of catalyst, the higher space velocities in this range being used at elevated pressures and higher temperatures. The mole ratio of methyl acetate can be varied from about 2.5:1 to about 60:1. Generally ratios from 5:1 to 15:1 are preferred. While the percentage conversion of formaldehyde to methyl acrylate is higher at ratios above 15:1 than at ratios in the preferred range, the use of such high mole ratios is disadvantageous because of the dilution of the product with unreacted methyl acetate.

Catalysts suggested in the prior art include those designated as dehydration catalysts, but it was discovered that the effectiveness of various members of the class varies considerably in an entirely unpredictable manner. For example, no reaction between methyl acetate and formaldehyde takes place in the presence of phosphoric acid on carbon, indicating that the reaction must involve something more than just a simple dehydration catalysis. Other catalysts and catalyst supports, e.g., alumina and various metal oxides supported on alumina, were investigated and found to give results inferior to those obtained when using catalysts according to this invention.

This invention will now be described with respect to specific embodiments thereof as illustrated in the examples which follow.

In all of the examples, the reaction was carried out in a system comprising a calibrated reservoir, metering pump, vaporizer, carburetor, preheater, catalyst tube, condensing system and wet test meter, all connected in series. In operation, a suitably proportioned mixture of vapors of methyl acetate and formaldehyde—and methanol and/or water vapor, when these were also present in the raw materials used—was led through an electrically heated and insulated tube to a preheated tube having a temperature-controlled electrical heating jacket. The preheated vapors passed directly from the preheater to a catalyst-packed reactor tube wherein the temperature was maintained as uniform as possible. The vapors issuing from the discharge end of the reactor tube were led to a condensing system including cold traps and suitable apparatus to measure and analyze the off-gas.

Before each run the system was flushed with inert gas, then each unit was brought to the desired temperature, and the flow of the mixture of reactants into the apparatus was then initiated.

EXAMPLE 1

A vapor mixture of methyl acetate and formaldehyde was passed through a bed of an alkaline earth metal aluminosilicate catalyst at atmospheric pressure. The formaldehyde was either aqueous formaldehyde (37% HCHO, 10–15% methanol, balance water) or methanolic formaldehyde (55% HCHO) as indicated in Table I below. Also given in Table I are the alkaline earth metal in the catalyst, mole ratio of methyl acetate to formaldehyde, reaction temperature, and space velocity. The percentage conversion and yield, both based on formaldehyde, are shown in Table I.

Table I

| Run No. | Catalyst cation | Solvent for HCHO | Ester: HCHO Mole Ratio | Temp., °C. | Space Velocity | Percent Conv. | Percent Yield |
|---|---|---|---|---|---|---|---|
| 1 | Mg | Methanol | 20:1 | 375 | 800 | 60 | 96 |
| 2 | Ca | ...do... | 20:1 | 375 | 800 | 63 | 96 |
| 3 | Ca | Water | 20:1 | 375 | 400 | 53 | 81 |
| 4 | Sr | Methanol | 20:1 | 375 | 400 | 68 | 88 |
| 5 | Ba | ...do... | 9.7:1 | 375 | 400 | 53 | 74 |
| 6 | Ba | ...do... | 19.4:1 | 375 | 420 | 64 | 88 |
| 7 | Ba | ...do... | 19.4:1 | 375 | 800 | 63 | 95 |
| 8 | Ba | ...do... | 19.4:1 | 375 | 1800 | 45 | 96 |
| 9 | Ba | Water | 19.4:1 | 375 | 220 | 63 | 83 |
| 10 | Ba | ...do... | 19.4:1 | 375 | 440 | 61 | 91 |
| 11 | Ba | ...do... | 19.4:1 | 390 | 440 | 65 | 93 |

EXAMPLE 2

A vapor mixture of methyl acetate and formaldehyde was passed through a bed of barium aluminosilicate catalyst, at a pressure of 100 p.s.i.g. and a temperature of 375° C. The formaldehyde was either a commercial aqueous solution (37% HCHO) or commercial methanolic solution (55% HCHO) as indicated in Table II below. The mole ratio of methyl acetate to formaldehyde, the space velocity (liters/hour/liter of catalyst), and the conversion of formaldehyde to methyl acrylate, are also shown in Table II.

Table II

| Run No. | Solvent for HCHO | Ester:HCHO Mole Ratio | Space Velocity | Percent Conv. | Percent Yield |
|---|---|---|---|---|---|
| 1 | Methanol | 5:1 | 2,600 | 27 | 56 |
| 2 | do | 10:1 | 1,200 | 51 | 72 |
| 3 | do | 10:1 | 2,000 | 47 | 71 |
| 4 | do | 10:1 | 3,400 | 44 | 68 |
| 5 | do | 20:1 | 1,900 | 63 | 83 |
| 6 | do | 20:1 | 3,100 | 66 | 99 |
| 7 | do | 20:1 | 5,100 | 56 | 99 |
| 8 | do | 20:1 | 10,000 | 31 | 97 |
| 9 | Water | 10:1 | 1,500 | 37 | 63 |
| 10 | do | 10:1 | 2,400 | 30 | 66 |
| 11 | do | 20:1 | 1,500 | 54 | 80 |
| 12 | do | 20:1 | 2,400 | 47 | 98 |

EXAMPLE 3

A vapor mixture of methyl acetate and formaldehyde was passed through a bed of a zeolite catalyst at atmospheric pressure and a temperature of 375° C. The formaldehyde was either aqueous formaldehyde (37% HCHO, 10–15% methanol, balance water) or methanolic formaldehyde (55% HCHO) as indicated in Table III below. Also given in Table III are the cation in the catalyst, the mole ratio of methyl acetate to formaldehyde, space velocity, and percentage conversion and yield, both based on formaldehyde.

Table III

| Run No. | Catalyst cation | Solvent for HCHO | Ester:HCHO Mole Ratio | Space Velocity | Percent Conv. | Percent Yield |
|---|---|---|---|---|---|---|
| 1 | Li | Methanol | 20:1 | 800 | 56 | 91 |
| 2 | Na | Water | 9.7:1 | 475 | 32 | 84 |
| 3 | Na | do | 19.4:1 | 415 | 39 | 68 |
| 4 | Na | do | 38.8:1 | 230 | 47 | 60 |
| 5 | Na | do | 60:1 | 210 | 55 | 90 |
| 6 | Co | do | 20:1 | 800 | 65 | 92 |
| 7 | Mn | do | 20:1 | 800 | 67 | 94 |
| 8 | Zn | do | 20:1 | 800 | 63 | ca. 95 |
| 9 | Cd | do | 20:1 | 800 | 55 | 71 |
| 10 | Pb | do | 20:1 | 800 | 38 | 79 |

The sodium aluminosilicate catalyst used in Example 3 was a commercial zeolite sold under the trade name "Decalso" by The Permutit Company. The other aluminosilicates were prepared from the sodium aluminosilicate by conventional base exchange procedures, and then dried at about 300° to 400° C.

It will be apparent that the present invention provides a process by which an improved yield in the production of methyl acrylate by the condensation of methyl acetate with formaldehyde from various sources may be obtained, by the use of a zeolite catalyst. In the foregoing examples, pure methyl acetate was used; similar results are obtained using a methanol-methyl acetate azeotrope. Other feeds than the aqueous or methanol solutions of formaldehyde disclosed by way of example in the runs above may be employed.

Thus it is to be understood that the process described herein may be modified to a considerable extent without departing from the spirit of the invention, which is not intended to be limited except as required by the appended claims.

We claim:

1. A process for the synthesis of methyl acrylate which comprises contacting a vapor mixture comprising methyl acetate and formaldehyde with a zeolite catalyst at a temperature at which methyl acrylate is formed, and recovering methyl acrylate from the resulting product.

2. The process of claim 1 in which the formaldehyde in the vapor mixture is furnished to the mixture from a liquid selected from the group consisting of solutions of formaldehyde in water and solutions of formaldehyde in methanol.

3. The process of claim 1 in which the molar ratio of methyl acetate to formaldehyde in said vapor mixture is between 2.5:1 and 60:1.

4. The process of claim 1 wherein the temperature is between about 325° and 425° C.

5. The process of claim 1 wherein the temperature is between about 350° and 400° C.

6. The process of claim 1 wherein the catalyst is an alkaline earth metal aluminosilicate.

7. The process of claim 1 wherein the catalyst is sodium aluminosilicate.

References Cited in the file of this patent

UNITED STATES PATENTS

| 2,734,074 | Redmon | Feb. 7, 1956 |
| 2,821,543 | Etherington | Jan. 28, 1958 |
| 2,945,057 | McDaniel et al. | July 12, 1960 |
| 3,014,958 | Koch et al. | Dec. 26, 1961 |